P. C. & O. A. FLAGSTAD.
MACHINE FOR MAKING PASTRY CONES.
APPLICATION FILED MAR. 11, 1910.
1,019,239.
Patented Mar. 5, 1912.
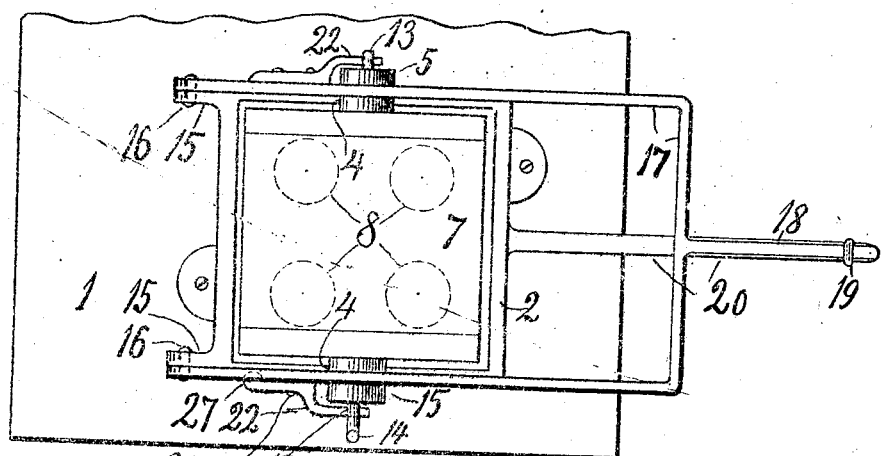
FIG. 1.
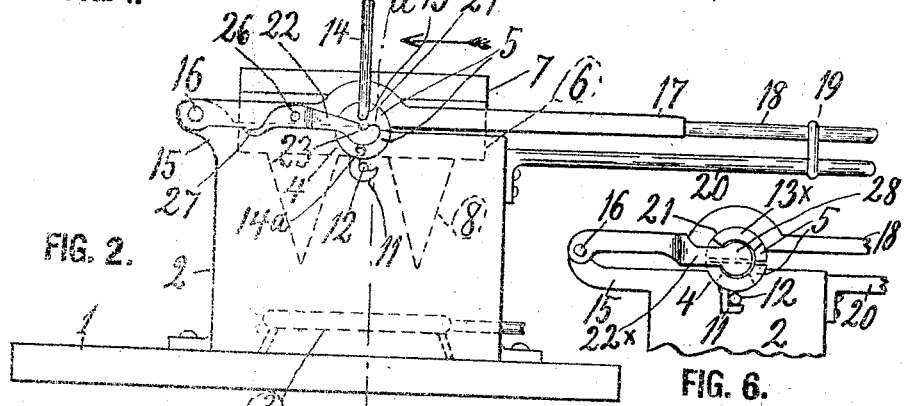
FIG. 2.
FIG. 6.
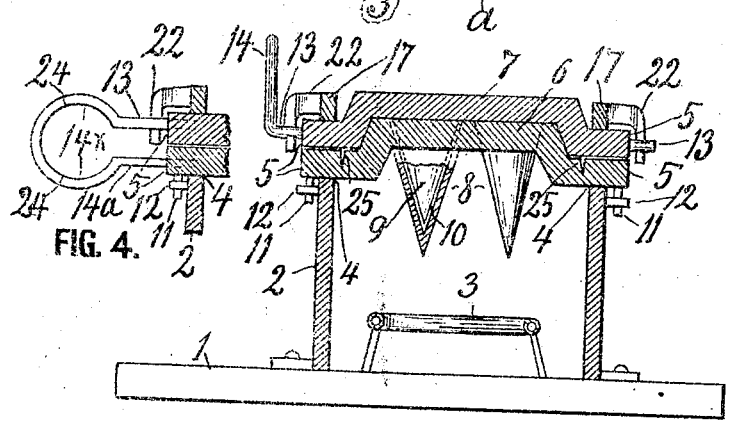
FIG. 4.
FIG. 3.
FIG. 5.
WITNESSES:
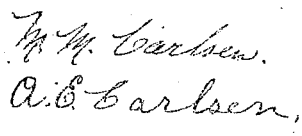
INVENTORS:
P. C. Flagstad.
O. A. Flagstad
BY their ATTORNEY:
A. M. Carlsen.

UNITED STATES PATENT OFFICE.

PETER CORNIE FLAGSTAD AND OSCAR A. FLAGSTAD, OF ST. PAUL, MINNESOTA.

MACHINE FOR MAKING PASTRY CONES.

1,019,239.  Specification of Letters Patent.  Patented Mar. 5, 1912.

Application filed March 11, 1910. Serial No. 548,613.

*To all whom it may concern:*

Be it known that we, PETER CORNIE FLAGSTAD and OSCAR A. FLAGSTAD, citizens of the United States, residing at St. Paul, in the county of Ramsey and State of Minnesota, have invented a new and useful Machine for Making Pastry Cones, of which the following is a specification.

Our invention relates to devices for molding and baking hollow pastry cones; and the object is to provide a machine of said kind with certain improvements, which will fully appear from the herein below description and claims; reference being had to the accompanying drawing, in which,—

Figure 1 is a top or plan view of the improved device. Fig. 2 is a side elevation. Fig. 3 is a vertical section on line a—a in Fig. 2. Fig. 4 is a detail of the upper left hand portion of the structure shown in Fig. 3 modified. Fig. 5 is a left hand end view of the handle and journals in Fig. 4. Fig. 6 is a detail of a portion of the structure shown in Fig. 2 modified.

Referring to the drawing by reference numerals, 1 designates a bench upon which is mounted a gas stove casing 2, having in its base a burner 3, and in its upper edge oppositely disposed open bearings 4, in which rotate the divided or split journals 5 of a pair of plates 6, 7, of which plate 6 is provided with conic molds 8 and plate 7 with conic cores 9 adapted to fit in the molds with spaces 10 between each core and its mold for the pastry to be molded and baked in. The journals of the mold plate 6 are each provided with a hook 11 adapted to catch under a stud 12 fixed in the side of the stove casing to hold the plate down when the core plate 7 is pulled upward therefrom after the plates are stuck together by the backed pastry. The journals of the core plate are each provided with a reduced extension 13, one of which is in Figs. 1, 2 and 3 shown to be provided with a handle 14 by which to rotate the plates at their journals. To rearward projections 15 of the stove casing are pivoted at 16 the branches of a bifurcated lever 17, whose free end forms a single arm or handle 18, which is adapted to be forcibly held by a ring 19 toward a horizontal arm 20 fixed to the front side of the stove casing.

Each branch of the lever is provided with an inverted open bearing 21 arranged to bear upon the upper side of one of the split journals 5; and near said bearing each branch carries an outward offset arm 22 provided with a notch 23 adapted to engage the under side of the extension 13 and lift the core plate when the lever is being raised; there is however some play between the notch and the extension 13, so as to permit the lever to make a blow upward against the extension and thereby start the plates from each other when they are stuck together by the baked pastry.

In Fig. 4 the handle by which the plates are rotated is so modified that each half journal at one end of each plate carries a hook-shaped half handle 14ˣ both of which have wedge-shaped extremities overlapping upon each other as best shown at 24 in Fig. 5; the object of this is to enable the hand that grasps the two handles to turn both plates and thereby avoid the tendency a single handle on one plate would have to change the correct relative position of the plates when they are partly separated by paste so that the dowel-pins 25 can not fully guide them. When said modified handles are employed, the straight portion 14ᵃ of the handle member on the mold plate contacts with the lower side of the arm or hanger 22 before the handle 14 can be turned fully downward when the plates are to be inverted during the baking; to make such contact unobstructive, the arm 22 may be pivoted at 26 to the lever (as shown in Fig. 2) so as to swing slightly upward when touched by the handle member 14ᵃ, when the latter is turned away again, the weight of the arm causes it to resume normal position with the hook 27 engaging beneath the lower edge of that branch of the lever.

In Fig. 6 is shown at 13ˣ the extension of the journal of the core plate segmental in cross section and thus having a groove in its under side for a rounded portion 28 of the arm 22ˣ to engage in and raise the plate. In all the modified forms it will be seen that it is the rotation of the journal 5 that causes the hooks 11 to engage the pins 12, and the projections of the journals of the core plate to engage the arms 22 of the lever.

In the operation of the machine, when the gas stove is lighted and the mold and core plates heated by the gas flame, the operator raises the lever and core plate high enough to admit the paste into the molds, whereupon he lowers the core plate upon the mold plate, and in order to get the required pressure on the journals of the plates he applies the ring 19 as shown. After the cones have partly baked with their small ends downward, they are by means of the handle 14 or 14ˣ as the case may be, turned with the large ends downward, the plates 6, 7 turning at their journals; and when the baking is finished, the ring 19 is removed, the lever and core plate 7 raised and inclined rearwardly against a suitable support (not shown) while the pastry cones are removed from the cores; further paste is then put into the molds, the core plate lowered again by the lever and the latter forced down and secured by the ring 19 and the operation repeated.

What we claim is:—

1. In a device of the kind described, a stove having an open top with open bearings in opposite sides thereof, a lever fulcrumed to the rear part of the stove and normally extending forwardly, said lever having inverted open bearings normally directly above the bearing of the stove, two plates provided with meeting half-journals adapted to occupy said bearings, conic molds on one of the plates, and conic cores on the other plate, to enter the molds with small spaces between them for pastry, means for guiding the plates together, means for turning the plates at the journals, catches on the stove and catches on the journals of the mold-carrying plate adapted to engage the catches on the stove by rotating the journal, projections on the journals of the core plate, catches on the lever to engage said projections by a turning movement of the journals, and means for holding the lever firmly down on the journals.

2. In a device of the kind described, a stove having an open top with open bearings in opposite sides thereof, a lever fulcrumed to the rear part of the stove and normally extending forwardly, said lever having inverted open bearings normally directly above the bearing of the stove, two plates provided with meeting half-journals adapted to occupy said bearings, conic molds on one of the plates, and conic cores on the other plate, to enter the molds with small spaces between them for pastry, means for guiding the plates together, means for turning the plates at the journals, catches on the stove and catches on the journals of the mold-carrying plate adapted to engage the catches on the stove by rotating the journal, projections on the journals of the core plate, catches on the lever to engage said projections by a turning movement of the journals, and means for holding the lever firmly down on the journals; one of the catches on the lever having a pivoted turning movement and means for restoring it automatically to normal position, the means for turning the journals consisting of two overlapping ha dles projecting one from each of the he journals adjacent the pivoted catch on t lever.

3. In a device of the kind described, stove having an open top with open bea ings in opposite sides thereof, a lever fi crumed to the rear part of the stove a normally extending forwardly; said lev having inverted open bearings normally rectly above the bearing of the stove, t plates provided with meeting half-journ adapted to occupy said bearings, conic mol on one of the plates, and conic cores on t other plate, to enter the molds with sm spaces between them for pastry, means guiding the plates together, means for tu ing the plates at the journals, catches on stove and catches on the journals of mold-carrying plate adapted to engage catches on the stove by rotating the jour projections on the journals of the core pl catches on the lever to engage said proj tions by a turning movement of the journ and means for holding the lever firmly do on the journals; said means for holding lever firmly down consisting of an arm tending forward from the front part of stove and a ring engaging said arm and front end of the lever to hold the lat down.

4. In a device of the kind described stove having an open top with open be ings in opposite sides thereof, a lever crumed to the rear part of the stove normally extending forwardly, said le having inverted open bearings normally rectly above the bearing of the stove, plates provided with meeting half-jour adapted to occupy said bearings, conic m on one of the plates, and conic cores on other plate, to enter the molds with sn spaces between them for pastry, means guiding the plates together, means for tu ing the plates at the journals, catches on stove and catches on the journals of mold-carrying plate adapted to engage catches on the stove by rotating the jour projections on the journals of the core pl means carried by the lever to engage projections by a turning movement of journals, and means for holding the l firmly down on the journals; said lever l ing a vertical play in its connections the journals of the plate it lifts, whereby momentum of the lever may be used separating the upper plate from the l one when they are stuck together by pastry.

5. In a device of the kind described, combination of a base and a stove ca secured thereon and having open jou bearings in its upper edges, a pair of pl one equipped with molds and the other cores adapted to go into the mold whei plates are together; each of said plates having two semicylindrical journals adapted when the plates are brought together to form cylindrical split journals in the bearings, means mounted on the base and arranged to lift the core-equipped plate away from the other plate; catches on the stove casing and catches on the mold-equipped plate arranged to engage the catches on the casing and retain the plate when the core-equipped plate is being pulled away therefrom.

In testimony whereof we affix our signatures, in presence of two witnesses.

P. CORNIE FLAGSTAD.
OSCAR A. FLAGSTAD.

Witnesses:
M. M. CARLSEN,
A. E. CARLSEN.